US009717173B2

(12) United States Patent
Sheppard et al.

(10) Patent No.: US 9,717,173 B2
(45) Date of Patent: Aug. 1, 2017

(54) MOLDED BOOT FOR DISPENSING SEEDS AND MULTIPLE TREATMENTS

(71) Applicant: Morris Industries Ltd., Saskatoon (CA)

(72) Inventors: Clint W. Sheppard, Yorkton (CA); Garth W. Massie, Biggar (CA)

(73) Assignee: Morris Industries Ltd. (CA)

( * ) Notice: Subject to any disclaimer, the term of this patent is extended or adjusted under 35 U.S.C. 154(b) by 5 days.

(21) Appl. No.: 14/541,997

(22) Filed: Nov. 14, 2014

(65) Prior Publication Data

US 2015/0144042 A1 May 28, 2015

Related U.S. Application Data

(60) Provisional application No. 61/908,314, filed on Nov. 25, 2013.

(51) Int. Cl.
*A01C 7/06* (2006.01)
*A01C 5/06* (2006.01)
*A01C 7/20* (2006.01)

(52) U.S. Cl.
CPC ................ *A01C 7/06* (2013.01); *A01C 5/062* (2013.01); *A01C 7/206* (2013.01)

(58) Field of Classification Search
USPC ................................ 111/152, 154, 170, 186
See application file for complete search history.

(56) References Cited

U.S. PATENT DOCUMENTS 594,669 A * 11/1897 Williams ............... A01O 5/062 111/152
2,315,204 A * 3/1943 Holle ..................... A01O 5/062 111/153
2,869,489 A * 1/1959 Buhr ...................... A01O 5/064 111/150
4,638,748 A * 1/1987 Kopecky .................. A01O 5/06 111/124
5,271,343 A * 12/1993 House .................... A01O 5/062 111/170
7,617,782 B2 11/2009 Sheppard et al.
2008/0093093 A1 4/2008 Sheppard et al.
2009/0013910 A1* 1/2009 Sheppard ............... A01O 5/062 111/187

FOREIGN PATENT DOCUMENTS

DE 3439476 A1 * 4/1986 ............... A01C 5/06
DE 102007014792 A1 * 10/2008 ............. A01C 5/062

* cited by examiner

*Primary Examiner* — Alicia Torres
(74) *Attorney, Agent, or Firm* — Hovey Williams LLP

(57) ABSTRACT

A double shoot dispensing system including a shank for opening a treatment trench, a seed shovel for creating left and right seed shelves above and on opposite sides of the treatment trench, and a two-piece boot body having a plurality of internal passages defined by assembled left and right halves of the body. A first passage directs the seeds onto the seed shelves, a second passage directs a granular fertilizer treatment into the treatment trench, and first and second tube passages receive first and second tubes delivering additional treatments into the treatment trench. Left and right ducts branch from the first passage so as to guide the deposit of the seeds. The body is constructed of a material having a relatively low mass and a relatively low coefficient of friction, such as polyurethane, polyethylene, nylon, or polyacetal, and is externally shaped so as to taper in a direction of travel.

5 Claims, 8 Drawing Sheets

MOLDED BOOT FOR DISPENSING SEEDS AND MULTIPLE TREATMENTS

RELATED APPLICATION

The present application is a non-provisional patent application and claims priority benefit, with regard to all common subject matter, of earlier-filed U.S. provisional patent application titled “MOLDED BOOT FOR SEED AND FERTILIZER PLACEMENT”, Ser. No. 61/908,314, filed Nov. 25, 2013, incorporated by reference in its entirety into the present document.

FIELD

The present invention relates to the field of agricultural implements and, more particularly, to so-called “double shoot” devices that dispense both seeds and fertilizer or other treatment in a single-pass operation.

BACKGROUND

Agricultural operations are being driven toward higher levels of cost efficiency and risk management due to narrower profit margins and higher input costs (e.g., seeds, fertilizer, chemicals). For this reason, it is desirable to dispense in a single-pass operation both seeds and fertilizer or other treatment relevant to the successful development or growth of the seeds in order to reduce fuel costs and minimize wear on machinery and equipment. However, combining these operations requires managing certain risks. On the one hand, dispensing too much fertilizer can result in “seed burn” or fertilizer toxicity which can increase seedling mortality. This can occur when the concentration of fertilizer (which usually contains a combination of nitrogen, phosphorus, potassium, and sulfur) near the seed is too high and poisons the seed, which prevents germination and growth. On the other hand, dispensing too little fertilizer can also lead to the loss of valuable production capacity due to a lack of nutrients available to the growing plants.

To manage these risks, a method that coordinates the dispensation of seeds and fertilizer or other treatment is used. One such method involves two separate application devices, one for seeds and one for fertilizer, mounted on the same implement frame. These devices may include one shank or disc-style opener to apply the seeds and another shank or disc-style opener to apply the fertilizer, and may operate by dispensing seeds in one set of spaced-apart rows and dispensing fertilizer in another set of rows that are alternatingly interposed between the seed rows. However, this suffers from several disadvantages, including added equipment cost associated with having separate openers, added fuel cost associated with pulling the additional openers, and problems with immobile nutrients (e.g., sulphur) being applied several inches away from the seed rows.

Another method involves using a “double shoot” boot to dispense both seeds and fertilizer through different outlets of the same boot. However, this also suffers from disadvantages, including a lack of proper separation between the seeds and the fertilizer due to variation in the final resting places of seeds and fertilizer as they leave the boot. In particular, seeds can bounce away from their intended positions into direct contact with fertilizer, and, similarly, fertilizer granules can bounce away from their intended positions into direct contact with seeds. Also, due to their complexity, many such boots are easily plugged with soil when used in wet conditions, which can result in poor penetration, poor seed placement, and excess draft loads on the drill, and, in general, interfere with the proper dispensation of seeds or fertilizer. Relatedly, many such boots can accumulate so much soil when used in wet conditions that they become too large and bulky to effectively penetrate the ground and properly place the seeds and fertilizer. Additionally, many such boots are initially configured to meet the user’s immediate needs, and are difficult or impossible to reconfigure if those needs change. For example, if the user selects a boot configured to primarily deliver granular fertilizer and secondarily deliver liquid fertilizer, it may be difficult or impossible to later switch to delivering anhydrous ammonia.

This background discussion is intended to provide information related to the present invention which is not necessarily prior art.

SUMMARY

Embodiments of the present invention solve the above-described and other problems and limitations by providing a double shoot dispensing system configured to both dispense seeds and one or more treatments in a single-pass operation, wherein a two-piece molded boot component of the dispensing system is significantly less likely to accumulate or become plugged with soil when used in wet conditions, thereby avoiding decreased performance and maintaining proper penetration, seed placement, and draft loads on the agricultural implement. Additionally, the two-piece design allows for more quickly and easily repairing or reconfiguring the boot when desired.

An embodiment of the double shoot dispensing system for dispensing into soil both seeds and one or more treatments in a single-pass operation may broadly comprise a shank configured to create a treatment trench in the soil; a seed shovel supported by the shank and configured to create a left seed shelf and a right seed shelf in the soil, wherein the left and right seed shelves are located above and on opposite sides of the treatment trench; and a boot body. The boot body may have at least three internal passages, including a first passage configured to direct the seeds to the at least one seed shelf, a second passage configured to direct a fertilizer treatment to the treatment trench, and a first tube passage configured to receive a first tube for delivering a second treatment to the treatment trench. The boot body may include a left body half defining a left side of each of the first passage, the second passage, and the first tube passage, and a right body half defining a right side of the first passage, the second passage, and the first tube passage, such that when the left body half is assembled with the right body half to form the boot body the first passage, the second passage, and the first tube passage are fully defined. The boot body may also be at least partially constructed of a material having a relatively low mass and a relatively low coefficient of friction.

In various implementations of this embodiment, the double shoot dispensing system may further include any one or more of the following additional features. The first tube passage may be located between the first passage and the second passage. The dispensing system may move in a direction of travel, and the at least three internal passages may be arranged in a line along the direction of travel. The dispensing system may further include a second tube passage configured to receive a second tube for delivering a third treatment to the treatment trench, wherein the left body half defines a left side of the second tube passage and the right body half may define a right side of the second tube passage, and wherein the second tube passage may be located on an opposite side of the second passage from the first passage. Furthermore, this second tube passage may receive and orient the second tube such that an outlet of the second tube is located behind the shank and under the seed shovel. The material of the boot body may be selected from the group consisting of: polyurethane, polyethylene, nylon, and polyacetal, and the material may be injection molded to form the boot body. The boot body may have a shape that is tapered in the direction of travel. The boot body may further include a left duct that projects outwardly and rearwardly from a lower portion of the left body half and a right duct that projects outwardly and rearwardly from a lower portion of the right body half, wherein the left and right ducts may be in communication with the first passage and configured to deposit the seeds moving through the first passage onto the left and right seed shelves. The boot body may further include a left mounting flange and a right mounting flange that facilitate attaching the boot body to the shank. The boot body further including a plurality of alignment structures presented by the left and rights body halves and configured to engage and align the left and right body halves during assembly of the boot body.

Additionally, each of these embodiments and implementations may be alternatively characterized as methods based on their functionalities.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to “one embodiment”, “an embodiment”, or “embodiments” mean that the feature or features referred to are included in at least one embodiment of the invention. Separate references to “one embodiment”, “an embodiment”, or “embodiments” in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides a double shoot dispensing system configured to both dispense seeds and one or more treatments in a single-pass operation, wherein a two-piece molded boot component of the dispensing system is significantly less likely to accumulate or become plugged with soil when used in wet conditions, thereby avoiding decreased performance and maintaining proper penetration, seed placement, and draft loads on the agricultural implement. Additionally, the two-piece design allows for more quickly and easily repairing or reconfiguring the boot when desired.

Figure 1:
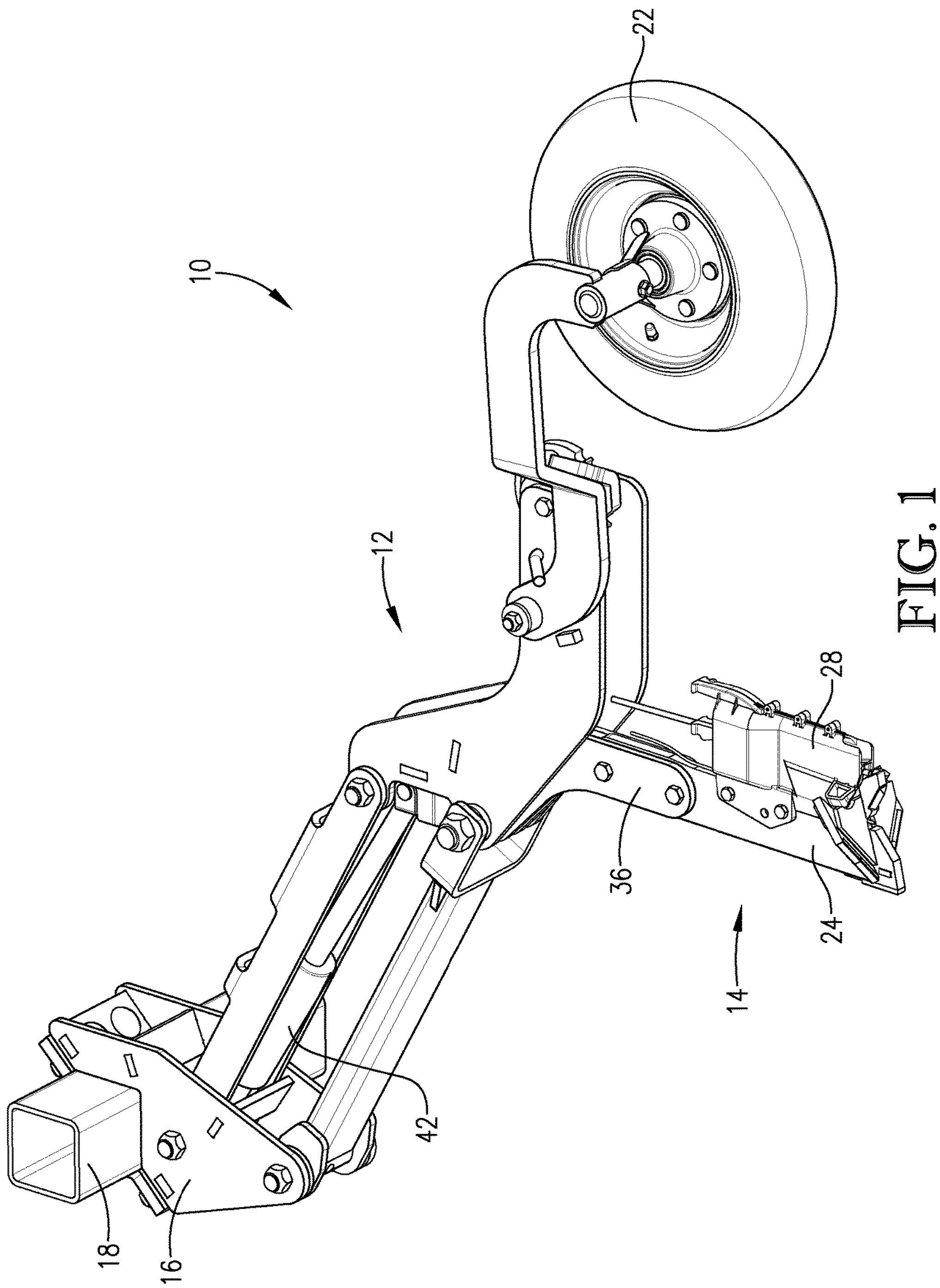
FIG. 1 is a fragmentary left rear isometric view of an exemplary row unit to which is mounted an embodiment of a double shoot dispensing system.
Figure 2:
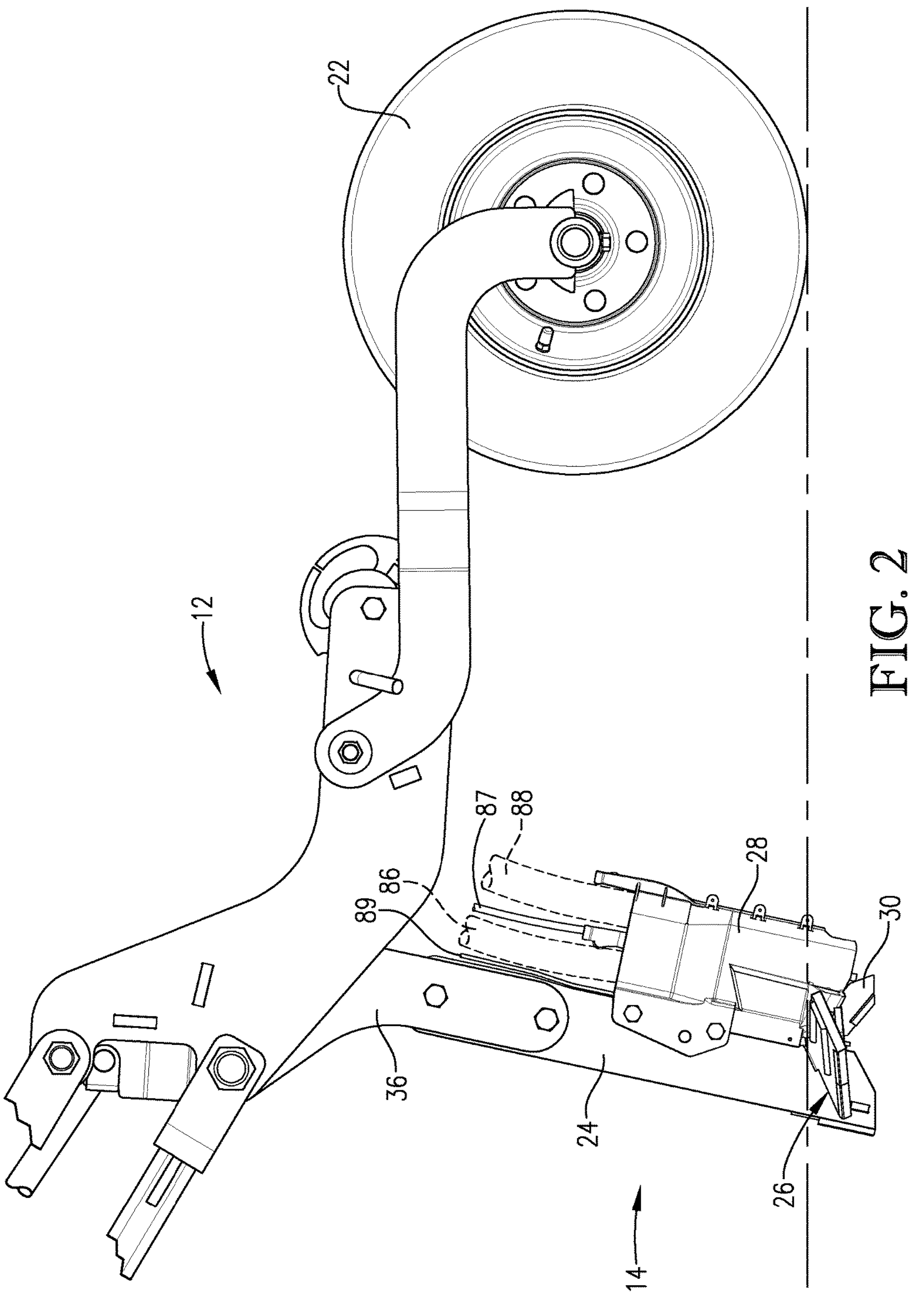
FIG. 2 is a fragmentary left side elevation view of the row unit of FIG. 1.
Figure 4:
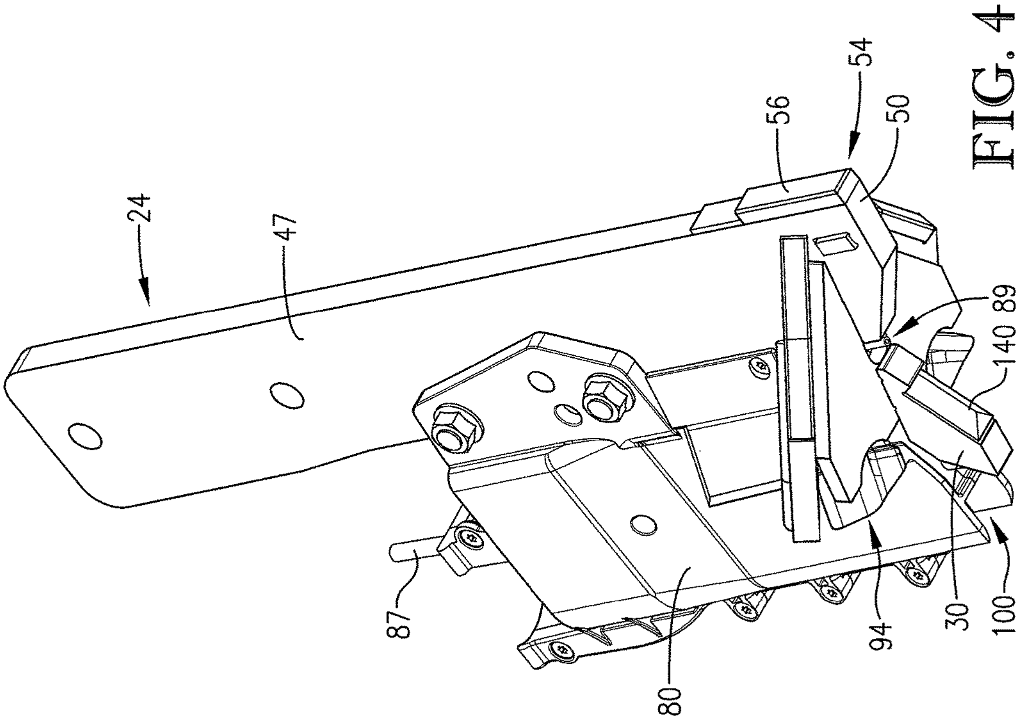
FIG. 4 is a right front isometric view of the dispensing system of FIG. 1.
Figure 3:
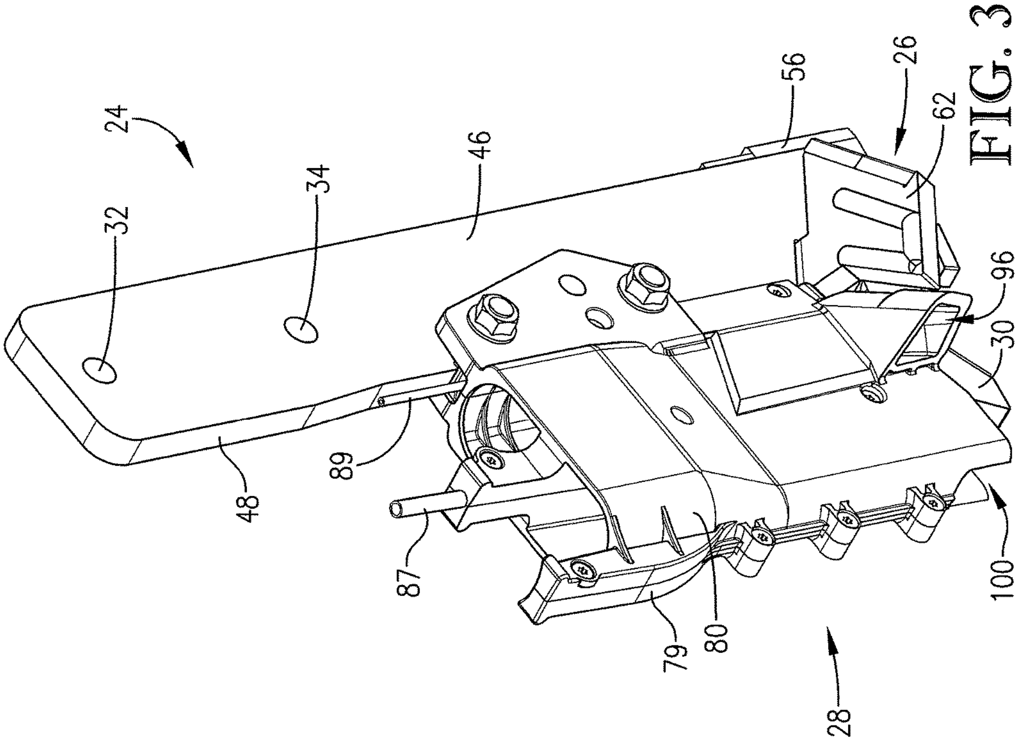
FIG. 3 is a right rear isometric view of the dispensing system of FIG. 1.
Figure 5:
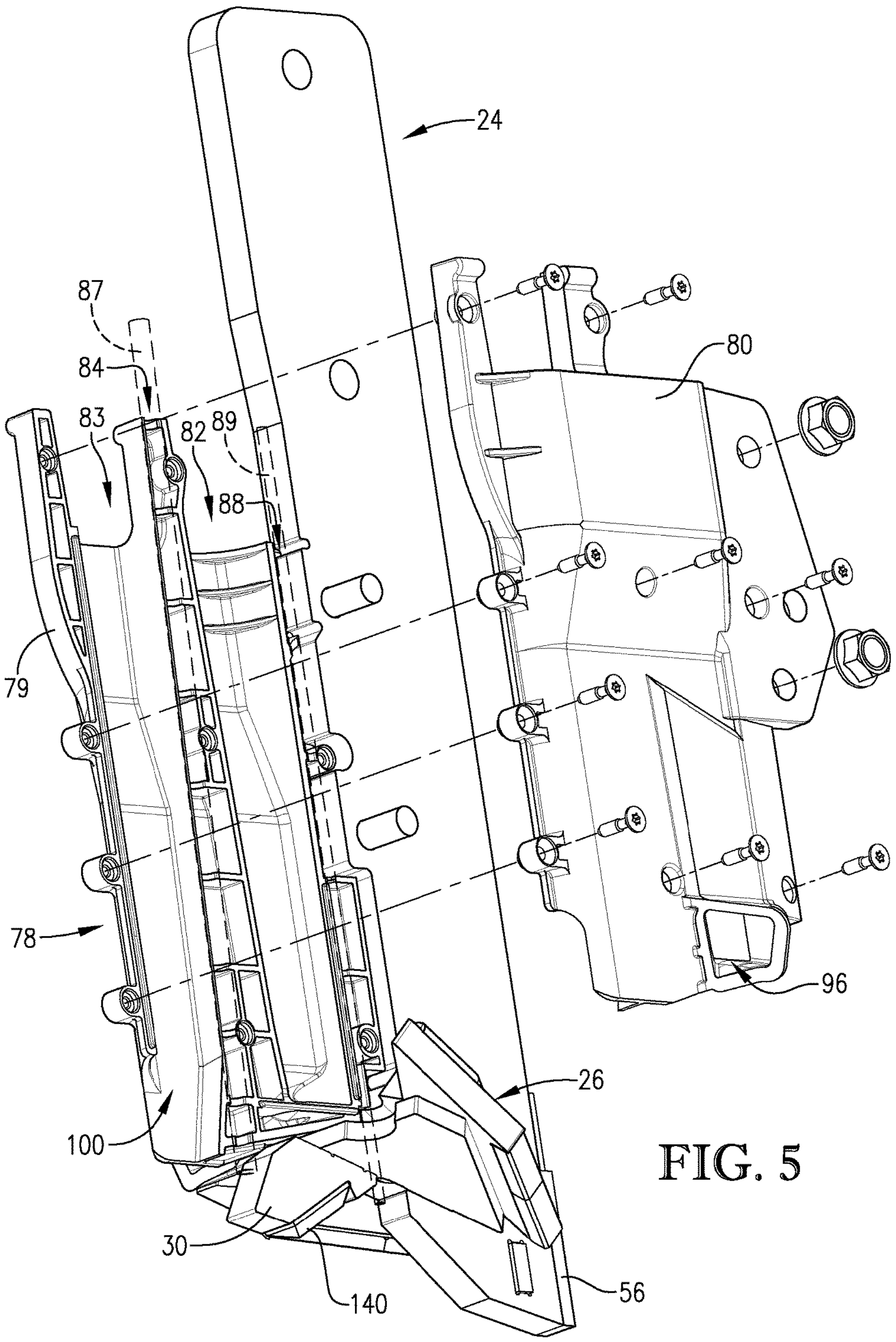
FIG. 5 is a right rear exploded isometric view of the dispensing system of FIG. 1.
Figure 6:
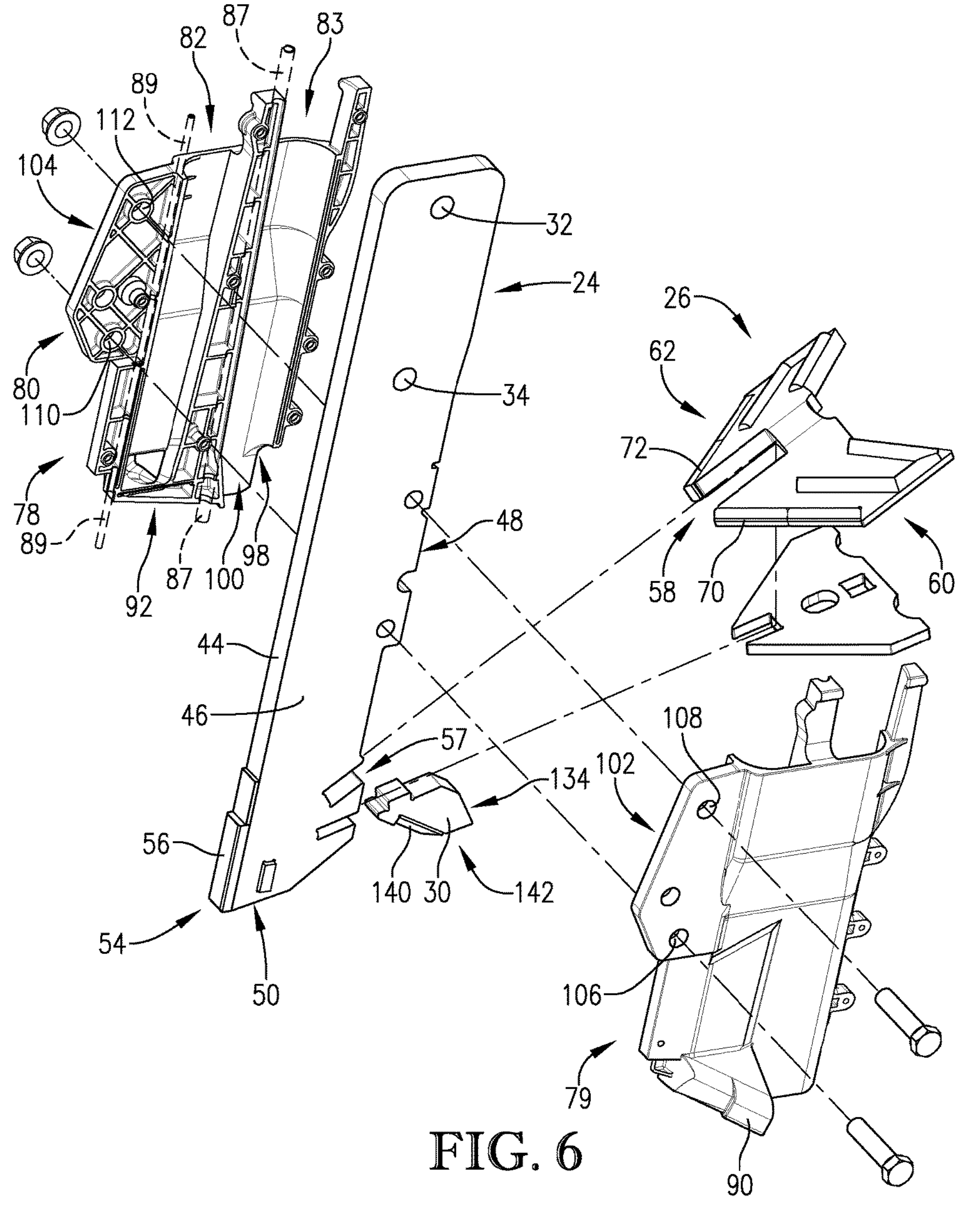
FIG. 6 is a left front exploded isometric view of the dispensing system of FIG. 1.
Figure 7:
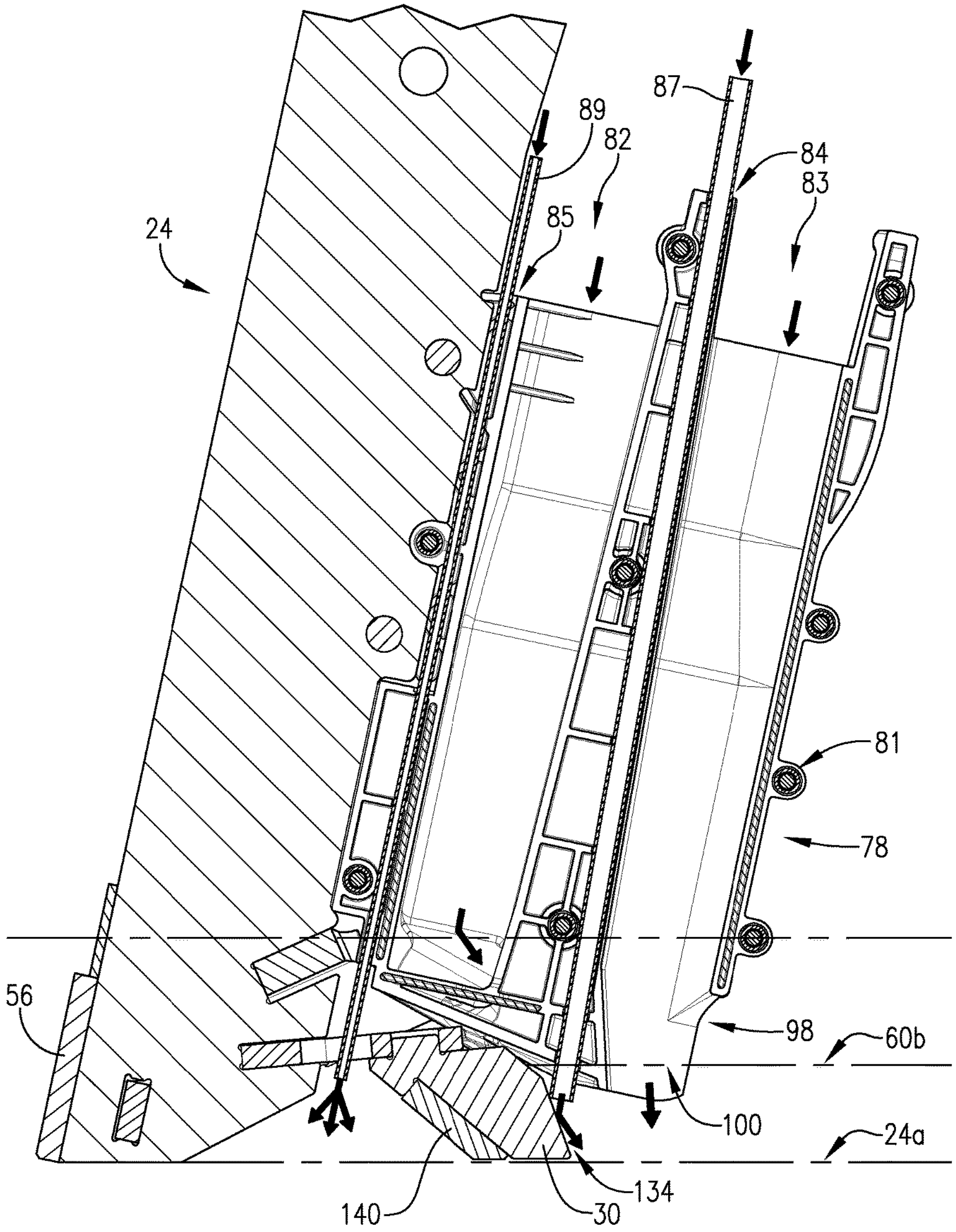
FIG. 7 is a fragmentary cross-sectional left side elevation of the dispensing system of FIG. 1, wherein broken lines indicate different cut lines in the soil, and wherein arrows indicate the directions of seeds and treatments moving through the dispensing system.
Figure 8:
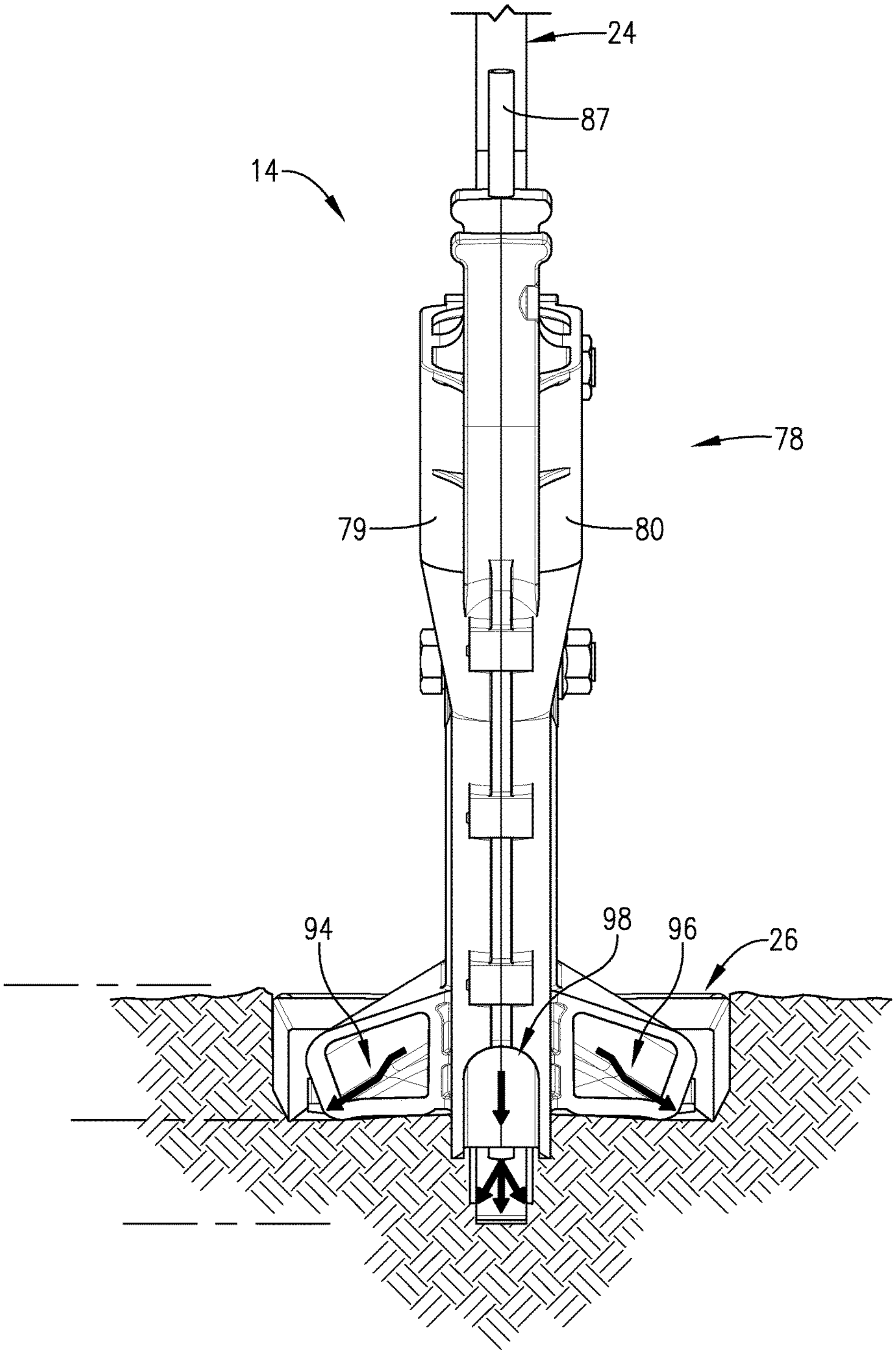
FIG. 8 is a fragmentary rear elevation view of the dispensing system of FIG. 1 as it moves through the soil.

Referring to FIG. 1, an exemplary opener or row unit 10 may include a carrier assembly 12 to which is mounted an embodiment of the double shoot dispensing system 14. In addition to the carrier assembly 12 and the dispensing system 14, the row unit 10 may also include a mounting bracket 16 for securing the carrier assembly 112 to a tool bar 18 component of a larger agricultural implement. Typically, the row unit 10 will be one of a plurality of such row units secured to the agricultural implement.

The carrier assembly 12 may be configured to move up and down so that the row unit 10 can follow the contours of the ground independently of the other row units secured to the agricultural implement. A trailing gauge wheel 22 may be used to determine the depth of penetration of the dispensing system 14 and to make the row unit 10 responsive to changes in the contour of the ground as the wheel 22 moves along the ground during operation. In one implementation, the carrier assembly 12 may take the form of a corresponding assembly disclosed in published patent application document 2008/0093093 (the ’093 application), filed Oct. 22, 2007, and titled “Combination Hydraulic Hold-Down and Lift System for an Agricultural implement”, which is hereby incorporated by reference in its entirety into the present specification as a description of an exemplary implementation of the carrier assembly 12 and its relationship to the dispensing system 14.

Referring also to FIGS. 2-9, the dispensing system 14 may include a shank 24, a shovel 26, a boot 28, and a guide member 30. The shank 24 may be an elongated, generally vertically oriented leg having a pair of mounting holes 32,34 adjacent to its upper end that allow for bolting or otherwise attaching the shank 24 to a mounting member 36 of the carrier assembly 14. The mounting member 36 may be controlled by a hydraulic cylinder 42 of the carrier assembly 14, as described in the incorporated ’093 application.

The shank 24 may have a leading edge 44, left and right sides 46,47, a trailing edge 48, and a bottom edge 50. The shank 24 may further include a tip 54 at the intersection of the leading edge 44 and the bottom edge 50. The shank 24 may be constructed of a single piece of material or of multiple pieces of material temporarily or permanently connected together. A hardened wear plate 56 or the like may be provided along the leading edge 44 in the vicinity of the tip 54 to resist premature wear on this portion of the shank 24 as it moves through the soil. The shank 24 may further include a receiving notch 57 in the trailing edge 48 for mounting the seed shovel 26. In operation, the row unit 10 may be moved in a direction of travel over a field such that the shank 24 cuts through the soil to create a fertilizer trench 24*a* (best seen in FIG. 9) which may generally correspond in size and shape to the lower portion of the shank 24. In one implementation, the bottom of the fertilizer trench 24*a* may be approximately between 0.5 inch and 1 inch, or approximately 0.75 inch, below the seed shelves 60*a*,62*b* discussed below.

The seed shovel 26 may have a mounting notch 58 and a pair of left and right wings 60,62. The mounting notch 58 may interlock with the receiving notch 57 of the shank 24 so that the seed shovel 26 is supported on the shank 24 in such a manner that the left and right wings 60,62 project downwardly and outwardly from the lower portion of the shank 24 in generally opposite left and right directions. The left and right wings 60,62 each present a respective left and right forward edge 70,72. In one implementation, the forward edges 70,72 may be hardened to resist wear. In operation, the wings 60,62, and specifically the forward edges 70,72 thereof, may create generally horizontally oriented left and right shelves 60*a*,62*a* (best seen in FIG. 9) in the soil above and to each side of the fertilizer trench 24*a* to receive seeds. In one implementation, the seed shelves 60*a*,62*a* may be approximately between 0.66 inch and 1 inch, or approximately 0.875 inch, below ground level. In one implementation, one of the left or right wings may be eliminated so that only a single seed shelf is created above and to one side of fertilizer trench 24*a*.

The boot 28 may have a body 78 comprising molded left and right body halves 79,80, each of which may present one or more molded alignment structures 81 configured to align the two body halves 79,80 during assembly of the body 78, and which may be secured together using mechanical fasteners, such as self-tapping screws. An interior of the assembled body 78 may be subdivided into several passages, wherein each body half 79,80 provides one half of each passage such that when the body halves 79,80 are secured together each passage is substantially fully defined. These passages may include a seed passage 82, a granular fertilizer passage 83, a first tube passage 84, and a second tube passage 85. The seed passage 82 is configured to be supplied with seeds by a seed supply conduit 86, and the granular fertilizer passage 83 is configured to be supplied with granular fertilizer by a fertilizer supply conduit 88. The first tube passage 84 may be configured to accommodate a liquid fertilizer tube 87 which may dispense any of a variety of liquid fertilizer products into the bottom of the fertilizer trench 24*a*. In one implementation, the first tube passage 84 may extend down the center of the body 28 between the seed passage 82 and the granular fertilizer passage 84. The second tube passage 85 may be configured to accommodate an anhydrous ammonia tube 89 which may dispense anhydrous ammonia fertilizer behind the shank 24, under the seed shovel 26, and in front of the fertilizer guide member 30 in order to reduce loss of gaseous product into the atmosphere. In one implementation, the second tube passage 85 may extend down the center of the body 78 between the seed passage 82 and the mounting flanges 102,104.

The conduits 86,88 and tubes 87,89 may be in communication with respective metered reservoirs (not shown) of seeds, granular fertilizer, liquid fertilizer, and anhydrous ammonia on the agricultural implement. In one implementation, the granular fertilizer passage 83, the first liquid fertilizer tube passage 84, and the second anhydrous ammonia tube passage 85 extend through the center plane of the boot body 78 defined by the two boot halves 79,80 so that all of the fertilizer products are maintained in the central fertilizer trench 24*a* to avoid fertilizer toxicity of the seeds. Thus, the boot 28 facilitates consistent placement of all seeds and up to three fertilizer products, and allows for switching between any combination of seed and fertilizer products without changing the boot 28. It should be noted that the present invention is not limited to dispensing the seeds and treatment substantially simultaneously.

Figure 9:
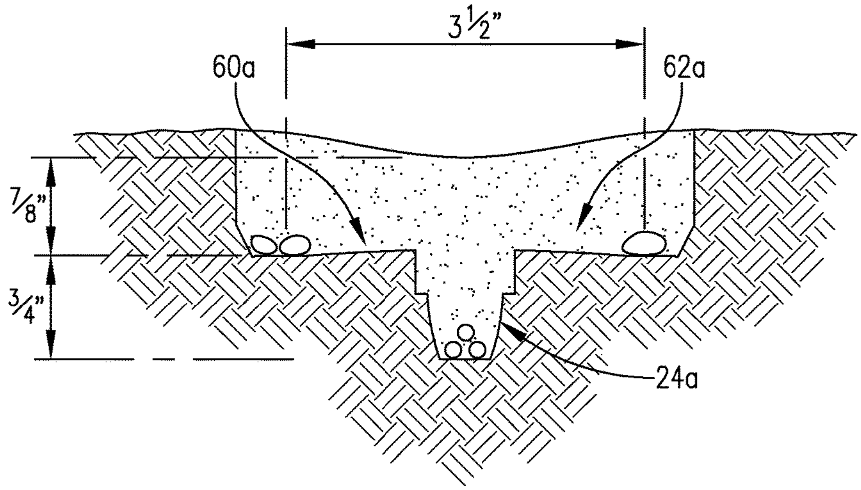
FIG. 9 is a fragmentary cross-sectional front elevation view of soil conditions following operation of the dispensing system of FIG. 1.

The body 78 may further include left and right protruding ducts 90,92 that project laterally outwardly from opposite sides of a lower portion of the body 78, wherein each duct 90,92 is associated with a respective body half 79,80. The ducts 90,92 may be in communication within the body 78 with the seed passage 82. Thus, in the lower region of the body 78, the seed passage 82 splits into two branches that correspond to the ducts 90,92 so as to direct seeds laterally outwardly and then rearwardly at the level of the ducts 90,92. Each duct 90,92 may terminate in a rearwardly facing seed outlet 94,96 through which the seeds are dispensed. Both seed outlets 94,96 are disposed laterally outboard of opposite sides 46,47 of the shank 24 such that seeds dispensed from the seed outlets 94,96 do so at a point laterally outboard of the fertilizer trench 24*a*. Furthermore, the seed outlets 94,96 are disposed at a slightly higher elevation than the shelf-forming forward wing edges 70,72 such that seeds dispensed from the seed outlets 94,96 are deposited on the seed shelves 60*a*,62*a* as shown in FIG. 9. In one implementation, the outlets 94,96 may deposit the seeds approximately between 3 inches and 4 inches, or approximately 3.5 inches, apart on apposite seed shelves 60*a*,62*a*.

The body 78 may further include a centrally disposed notch 98 that opens to the rear and bottom of the body 78, wherein each body half 79,80 defines a respective half of the notch 98. The notch 98 is disposed rearwardly of the seed outlets 94,96, having its forward termination at a point just behind the seed passage 82. Along its top extremity, the notch 98 intersects with the granular fertilizer passage 83 so as to define a granular fertilizer outlet 100 that opens into the notch 98 from above. Granular fertilizer dispensed from the granular fertilizer outlet 100 is deposited in the fertilizer trench 24*a* between the seed shelves 60*a*,62*a*, as shown in FIG. 9.

The boot 28 may further include left and right mounting flanges 102,104 that project forwardly from a top portion of the body 78, wherein each mounting flange 102,104 is provided by a respective body half 79,80. The mounting flanges 102,104 may be provided with bolt holes 106,108, 110,112 to facilitate attaching the boot 28 to the shank 24 using mechanical fasteners, such as carriage bolts, extending through the respectively aligned holes.

The materials and design of the boot 28 may be such as to substantially reduce the adherence of soil (i.e., build-up) to the exterior surfaces of the boot 28. More specifically, the boot 28 may be constructed of injection-molded polyurethane and/or polyethylene which have relatively low coefficients of friction and therefore both minimize external soil adherence even under wet conditions and minimize internal build-up of fertilizer dust, liquid fertilizer residue, and powdered seed coat treatments within the passages. Furthermore, the use of polyurethane and/or polyethylene molded parts may result in a large reduction in the mass of the boot 28 (a 700% reduction in one implementation). Alternatives materials for the boot 28 include nylon, polyacetal, and the like. Joining strategies for the two body halves 79,80 include different kinds of mechanical fasteners, glue, cinch clamps, laser welding, and the like. Additionally, the shape of the boot 28 may be externally tapered in the direction of travel to present less surface area and thereby further reduce soil adhesion.

The fertilizer guide member 30 may be a generally wedge-shaped block of material that projects downwardly and rearwardly from the boot 28. The guide member 30 may present a downwardly and rearwardly inclined, rearwardly facing guide surface 134 that is adapted to detect liquid fertilizer exiting the liquid fertilizer tube 87 extending through the first tube passage 84 and direct it rearwardly and downwardly into the bottom of the fertilizer trench 24*a*. In one implementation, the guide surface 134 may be concave to assist in confining and directing the liquid fertilizer as it travels down the guide member 30 and into the trench 24*a*. The guide member 30 may further include a forwardly facing, beveled front edge 140 that is inclined downwardly and rearwardly, and a substantially flat bottom surface 142 that, during operation, moves along the bottom of the fertilizer trench 24*a*. In one implementation, the guide member 30 may be substantially the same width as the shank 24.

In operation, the dispensing system 14 may operate substantially as follows. As the row unit 10 travels forwardly during seeding and fertilizing operations, the shank 24 opens the fertilizer trench 24*a*, while the forward edges 70,72 of the left and right wings 60,62 of the shovel 26 cut the seed shelves 60*a*,62*a* above and to the left and right of the fertilizer trench 24*a*. As the wing edges 70,72 cut the shelves 60*a*,62*a* in the soil, the wings 60,62 lift and laterally deflect soil off the shelves 60*a*,62*a*. This wave of lifted soil is maintained off the newly prepared shelves 60*a*,62*a* until such time as the seed outlets 94,96 have passed by, thereby providing ample opportunity for seeds emanating from the outlets 94,96 to come to rest upon the shelves 60*a*,62*a*.

As the fertilizer guide 30 travels forwardly within the trench 24*a* prepared by the shank 24, its front edge 140 pushes through any loose soil in the trench 24*a* and moves it aside until after the lower rearmost extremity of the guide member 30 has passed. Thus, the guide member 30 maintains the integrity of the trench 24*a* and affords an unobstructed path to the bottom of trench 24*a* for fertilizer dispensed from the outlet 100 of the granular fertilizer passage 83 and the outlet of the liquid fertilizer tube 87. The rear guide surface 134 of the guide member 30 helps to ensure that the liquid fertilizer exiting the liquid fertilizer tube 87 is properly deposited in the trench 24*a*. The guide member 30 therefore serves the dual purposes of both maintaining the integrity of fertilizer trench 24*a* and guiding the fertilizer into its proper location. It will be noted that the guide member 30 does not cut a new trench in the ground, which would otherwise increase the ground penetration force required and cause unnecessarily heavy upward loads on the shank 24. Moreover, because it is merely cleaning loose dirt from the trench 24*a* already cut by the shank 24, the guide member 30 does not break undisturbed ground which could otherwise cause the seed bed to be shattered and compromise the shelves 60*a*,62*a*.

The guide member 30 also helps avoid the plugging of the outlet 100 by mud which might otherwise tend to curl up into the fertilizer passage 83. The free flow of fertilizer through the passage 83 and the outlet 100 is thus assured, due in part to the presence of the guide member 30 which occupies space immediately below and to the rear of the outlet 100. Also, because the outlet 100 is located behind the wings 60,62, there is no tendency for the wings 60,62 to push accumulating mud up into the fertilizer tube 87, a common occurrence in many conventional double shoot systems. The rearward-facing orientation of the seed outlets 94,96 helps avoid the plugging of those structures, while the rearwardly opening orientation of the notch 98 associated with the outlet 100 helps prevent plugging by mud and plant material at that location as well.

The two-piece design of the body 78 of the boot 28, and the multi-piece nature of the shank 24, shovel 26, and other components allows the end-user to replace only individual components that are worn out, rather than replace the entire assembly. As discussed, the boot 28 is preferably constructed of injection-molded low friction polyurethane and/or polyethylene, and the other major components may be constructed from a strong, wear-resistant metal or other wear-resistant material and may be provided with additional wear-resistant portions such as the wear strip 56 on the shank 24 and the forward edges 70,72 of the wings 60,62.

Thus, the present invention provides advantages over the prior art. In particular, the two-piece molded boot 28 is significantly less likely to accumulate or become plugged with soil when used in wet conditions, thereby avoiding decreased performance and maintaining proper penetration, seed placement, and draft loads on the agricultural implement. Additionally, the two-piece design allows for more quickly and easily repairing or reconfiguring the boot 28 when desired.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A double shoot dispensing system for dispensing into soil both seeds and one or more treatments in a single-pass operation, wherein during operation the double shoot dispensing system moves in a direction of travel, the double shoot dispensing system comprising:

a shank configured to create a treatment trench in the soil;

a seed shovel supported by the shank and configured to create a left seed shelf and a right seed shelf in the soil located above and on opposite sides of the treatment trench;

a two-piece boot body having at least four internal passages, including— a first passage configured to direct the seeds onto the left and right seed shelves, a second passage configured to direct a fertilizer treatment to the treatment trench, a first tube passage configured to receive a first tube for delivering a second treatment to the treatment trench, wherein the first tube passage is located between the first passage and the second passage, and a second tube passage configured to receive a second tube for delivering a third treatment to the treatment trench, wherein the second tube passage is located on an opposite side of the first passage from the second passage, and wherein the second tube passage receives and orients the second tube such that an outlet of the second tube is located behind the shank and under the seed shovel; and the two-piece boot body including a left body half defining a left side of each of the first passage, the second passage, the first tube passage, and the second tube passage and a right body half defining a right side of the first passage, the second passage, the first tube passage, and the second tube passage such that when the left body half is assembled with the right body half to form the two-piece boot body the first passage, the second passage, the first tube passage, and the second tube passage are fully defined, the two-piece boot body having a left duct that projects outwardly and rearwardly from a lower portion of the left body half, and a right duct that projects outwardly and rearwardly from a lower portion of the right body half, wherein the left and right ducts are in communication with the first passage and configured to deposit the seeds moving through the first passage onto the left and right seed shelves, the two-piece boot body being at least partially constructed of a material having a relatively low mass and a relatively low coefficient of friction, the material of the two-piece boot body being selected from the group consisting of: polyurethane, polyethylene, nylon, and polyacetal, and the two-piece boot body has an external shape that is tapered in the direction of travel.

2. The double shoot dispensing system as set forth in claim 1, wherein the at least four internal passages are arranged in a line along the direction of travel.

3. The double shoot dispensing system as set forth in claim 1, the left body half having a left mounting flange, and the right body half having a right mounting flange, wherein the left and right mounting flanges facilitate attaching the left and right body halves to the shank.

4. The double shoot dispensing system as set forth in claim 1, the two-piece boot body further including a plurality of alignment structures presented by the left and right body halves and configured to engage and align the left and right body halves during assembly of the two-piece boot body.

5. The double shoot dispensing system as set forth in claim 1, further comprising a guide member projecting downwardly and rearwardly from the shank below the boot, and having a rearwardly facing concave guide surface, wherein the first tube passage receives and orients the first tube such that an outlet of the first tube directs the second treatment against the concave guide surface of the guide member.

* * * * *